July 13, 1937.   G. JOHNSON   2,087,204
METHOD OF MAKING FASTENERS
Filed Nov. 14, 1934

Inventor:
Gustav Johnson.
by Walter S. Jones
Atty.

Patented July 13, 1937

2,087,204

UNITED STATES PATENT OFFICE 2,087,204

METHOD OF MAKING FASTENERS

Gustav Johnson, West Roxbury, Mass., assignor to United-Carr Fastener Corporation, Cambridge, Mass., a corporation of Massachusetts Application November 14, 1934, Serial No. 753,007

4 Claims. (Cl. 29—148)

My invention aims to provide a method of making fasteners for fastener-secured installations.

In the drawing, which illustrates a preferred embodiment of my invention:—

The embodiment of my invention as illustrated presents an improved fastener for use in installations where one part, such as a cover or cowling, is secured to a supporting structure, such as a framework or girder member. Though adapted to many different uses, it was particularly designed to fasten the cowling of an airplane to the framework. Since this calls for a fastener having great strength and simplicity, as well as positive action, I believe this fastener to be adapted to all installations calling for such qualities.

Figure 1:
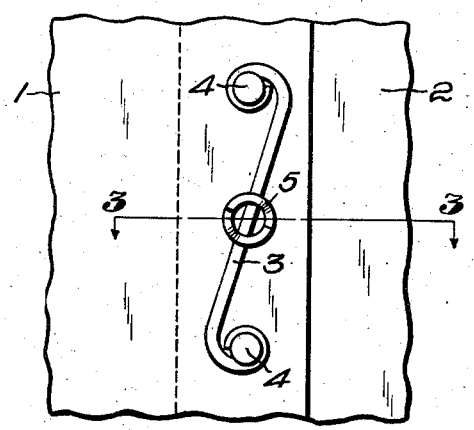
Figure 1 is a bottom view of a complete installation, including my improved fastener member.
Figure 2:
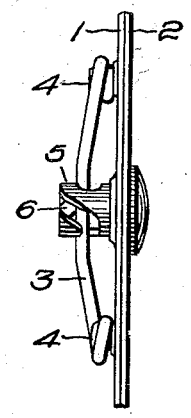
Fig. 2 is a side view of the installation shown in Fig. 1.
Figure 3:
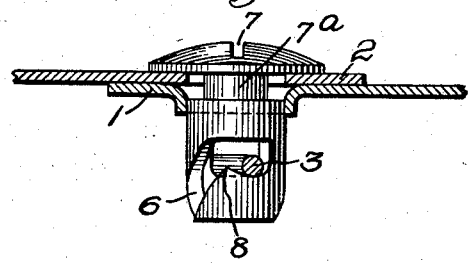
Fig. 3 is a partial cross-section on the line 3—3 of Fig. 1.

The particular installation shown in Figs. 1, 2, and 3 includes a supporting member 1, a cover 2 superposed thereon, and a spring member 3 secured by rivets 4 to the supporting member 1. Both the supporting member and the cover are provided with substantially circular apertures of approximately the same size, one overlying the other to form one continuous aperture, through which is passed the fastener member 5. This member 5 is provided with bayonet slots 6, which engage the spring member 3, and a slotted head 7, which may be rotated with a coin or screw driver until the spring 3 passes the shoulders 8 on the walls of the slots. These shoulders serve as locking means to hold the fastening member in engagement with the spring.

It is the novel method I have invented for manufacturing member 5 which I particularly wish to point out in this specification and secure by Letters Patent. Heretofore fastening members of the same general class have been made from solid stock by turning operations on a screw machine. This is a very slow and expensive method and increases unnecessarily the final cost of the complete fastener. I have eliminated a large part of this production cost by forming my improved fastener from sheet metal.

Figure 4:
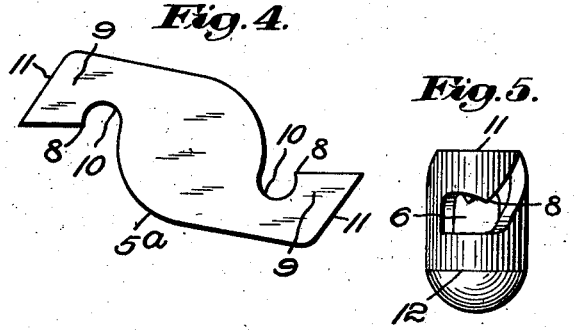
Fig. 4 is the blank from which the removable fastener element is formed.

The first step in the process is to blank from a strip of relatively heavy sheet metal a blank 5a of substantially the shape shown in Fig. 4. The body of the blank is substantially circular and there are a pair of specially shaped projections 9 extending from diametrically opposed points in the circular portion. The two small reverse curves 10 form the shoulders 8, mentioned above.

Figure 5:
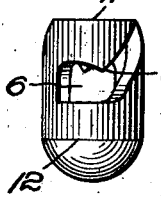
Fig. 5 is an elevational view of the blank after the drawing operations.
Figure 6:
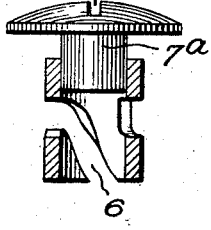
Fig. 6 is a broken side view of the fastener per se.

The next step comprises a series of drawing operations whereby the blank is brought to the shape shown in Fig. 5. The ends 11 of the projections 9 now form the open end of a tube-like member, of which the opposite end is closed. The sides of the projections 9 are spaced evenly apart to form the slots which engage the spring member 3. The closed end of the member is now severed at the point indicated by the line 12 of Fig. 5. At this point the head 7 is assembled in the end of the tubular member which has been opened up by the severing operation just described. The shank 7a of the slotted head may be secured in the tube in any suitable manner, and I prefer to make the relative size of the tube and shank such that the shank may be driven into the tube and be held there due to the tight fit. An alternative method, as satisfactory but more expensive, is to weld the two parts together. Furthermore I have shown a head member having a screw driver slot, although such a slot is not to be considered the only possible means of operating the fastener.

To make more clear the nature of my improved fastener member, I shall now proceed with a description of its mode of operation. The first step is to align the aperture in the cover with the aperture in the support. The spring 3 is so positioned that it passes directly across the aperture and is spaced from that side of the support away from the cover. The fastener member is now inserted in the aperture and rotated until the slots engage the spring. It is then further rotated until the spring snaps over the shoulders 8. During the rotation the spring is brought nearer to the support and the cover is forced tight against the support. The tension of the spring on the fastener member serves to hold the cover securely against the support at all times.

While I have illustrated and described a preferred form of my invention, I do not wish to be limited by such description, since the scope of my invention is best defined by the following claims.

I claim:

1. The method of making a fastener member of the class described which comprises subjecting a blank of preformed shape to a series of drawing operations whereby said blank is formed into a cylinder having a closed end and a pair of oppositely disposed spiral slots extending from the open end of said cylinder towards the closed end thereof, severing the closed end of said cylinder from the body thereof and securing in the same end a preformed actuating member.

2. The method of making a fastener member of the class described which comprises blanking from a strip of sheet metal a substantially S-shaped blank having an enlarged mid-portion, subjecting said blank to a series of drawing operations whereby the extremities of said blank are brought into spaced relationship and cooperate with said enlarged mid-portion to form a substantially tubular member having one closed end and a pair of oppositely disposed slots extending from the open end of said tubular member in corresponding spiral curves towards the closed end thereof, severing the closed end of the tubular member from the body thereof and securing in the opening thus formed a head member having a shank adapted to be inserted in said opening and a transverse head provided with actuating means.

3. The method of making a fastener member of the class described which comprises blanking from a strip of sheet metal a blank of predetermined outline, said blank having a substantially circular mid-portion and a pair of hook-shaped projections extending along oppositely disposed tangents from diametrically opposed points in said circular portion, subjecting the blank thus formed to a series of drawing operations whereby said hook-shaped projections are brought into predetermined spaced relationship to form an incomplete cylinder having a closed end formed by the mid-portion of said blank and an open end formed by the extremities of the projections on said blank, curving the projections of said blank so that their edges cooperate to form a pair of opposed slots extending from the open end of said cylinder in corresponding spiral curves toward the closed end thereof, severing the material forming the closed end from the cylinder and securing in the opening thus formed the shank of a preformed actuating member.

4. The method of making a fastener member of the class described which comprises forming a blank of preformed shape, drawing said blank to form a cylinder having a closed end and a pair of oppositely disposed spiral slots extending from the open end of said cylinder toward the closed end thereof, severing the closed end of said cylinder from the body thereof, and securing in the same end a preformed actuating member.

GUSTAV JOHNSON.